(12) United States Patent
Dackam et al.

(10) Patent No.: US 8,435,319 B2
(45) Date of Patent: May 7, 2013

(54) FILTER UNIT FOR THE FILTRATION OF GASEOUS FLUIDS, IN PARTICULAR AIR FILTER IN INTERNAL COMBUSTION ENGINES

(76) Inventors: Cedric Dackam, Lauf an der Pegnitz (DE); Jasris Jasnie, Kalamazoo, MI (US)

( * ) Notice: Subject to any disclaimer, the term of this patent is extended or adjusted under 35 U.S.C. 154(b) by 352 days.

(21) Appl. No.: 12/746,333

(22) PCT Filed: Dec. 4, 2008

(86) PCT No.: PCT/EP2008/066791
§ 371 (c)(1),
(2), (4) Date: Jul. 21, 2010

(87) PCT Pub. No.: WO2009/071626
PCT Pub. Date: Jun. 11, 2009

(65) Prior Publication Data
US 2011/0005397 A1 Jan. 13, 2011

Related U.S. Application Data

(60) Provisional application No. 61/012,290, filed on Dec. 7, 2007.

(51) Int. Cl.
*B01D 46/00* (2006.01)

(52) U.S. Cl.
USPC .................. 55/499; 55/498; 55/501; 55/520; 55/521

(58) Field of Classification Search .................... 55/498, 55/499, 501, 520, 521, DIG. 31
See application file for complete search history.

(56) References Cited

U.S. PATENT DOCUMENTS

| 5,820,646 | A | 10/1998 | Gillingham |
| 6,610,117 | B2 * | 8/2003 | Gieseke et al. ............ 55/385.3 |
| 6,797,027 | B2 * | 9/2004 | Stenersen et al. .......... 55/350.1 |
| 2002/0100262 | A1 | 8/2002 | Gieseke |

FOREIGN PATENT DOCUMENTS

WO WO2008125475 10/2008

OTHER PUBLICATIONS

PCT search report PCT/EP2008/066791.

* cited by examiner

*Primary Examiner* — Robert Clemente
(74) *Attorney, Agent, or Firm* — James Hasselbeck

(57) ABSTRACT

A filter unit (1) for the filtration of gaseous fluids has a filter web (13), which is wound in a spiral about a support core (18), and which is provided with parallel flow channels (16a, 16b) for the fluid. Flow channels (16a, 16b) which are directly adjacent to the support core, are covered by a cover element (4), which is connected to a component of the filter unit (1).

19 Claims, 10 Drawing Sheets

FILTER UNIT FOR THE FILTRATION OF GASEOUS FLUIDS, IN PARTICULAR AIR FILTER IN INTERNAL COMBUSTION ENGINES

CROSS REFERENCE TO RELATED APPLICATIONS

This application is US National Stage Entry of international patent application no. PCT/EP2008/066791, filed Dec. 4, 2008 designating the United States of America, the entire disclosure of which is incorporated herein by reference. Priority is claimed based on U.S. Provisional Patent Application 61/012,290 filed Dec. 7, 2007.

TECHNICAL FIELD

The invention concerns a filter unit for filtration of gaseous fluids, in particular an air filter in internal combustion engines.

PRIOR ART

In U.S. Pat. No. 6,966,940 B2 an air filter is disclosed that is integrated into the intake manifold of an internal combustion engine for filtration of the combustion air. The filter element of the air filter is embodied as a wound filter that is comprised of a spirally wound filter sheet wherein the filter sheet is corrugated so that in axial direction of the filter element airflow channels are formed. The airflow channels in the area of the axial end faces are alternatingly open or closed off so that at the axial inflow side of the filter element only every other flow channel is open for inflow of combustion air to be filtered wherein the flow channels open at the inflow side are closed off at the outflow side. The combustion air must therefore within the filter element radially flow through the walls limiting each one of the flow channels before an axial discharge from the neighboring flow channel is possible.

For producing the filter element, the corrugated filter sheet is spirally wound about a support core that imparts stability to the filter element. Sections of the filter sheet that rest immediately at the outer wall of the support core are glued onto the support core.

The support core has an effect on the flow of the combustion air that flows out of the filter element. The support core generates turbulence in the outflowing air and the turbulence impairs laminar flow. Therefore, measuring results of a mass airflow sensor, arranged in the intake manifold for determining the throughput of mass airflow downstream of the filter element, may be affected. The impairment of measuring results is expressed in increased measuring noise.

The invention has the object to embody with simple constructive measures a filter unit for filtration of gaseous fluids that is provided with a filter sheet that is spirally wound about a support core in such a way that at the outflow side of the filter element turbulence is prevented as much as possible.

SUMMARY OF THE INVENTION

The filter unit according to the invention serves for filtration of gaseous fluids and is used in particular as an air filter in internal combustion engines for filtration of the combustion air that is to be supplied to the internal combustion engine. Basically, use for filtration of other gaseous fluids is possible also, for example, the air to be supplied to the interior of the vehicle.

The filter unit has a filter element that is comprised of a filter sheet wound spirally about a support core so that parallel extending flow channels for the fluid are formed in the filter element. For example, the filter sheet can have a corrugated structure wherein immediately adjacent valleys and peaks of the corrugation each form a flow channel extending in the axial direction. The flow channels are alternatingly open or closed off at the axial end faces such that a first flow channel at the axial inflow side is open and at the oppositely positioned outflow side is closed off and a second neighboring flow channel at the axial inflow side is closed off and at the oppositely positioned axial outflow side is open. In this way, through a limited number of flow channels the gaseous fluid reaches the interior of the filter element where a radial passage across the walls of the flow channels into the immediately neighboring flow channels takes place. By means of these second flow channels that are closed off at the inflow side and open at the outflow side the purified gaseous fluid can axially flow out of the filter element.

According to the invention, those flow channels that are arranged immediately adjacent to the support core and whose axial outflow side is embodied to be open are covered by an additional cover element at the outflow side that is connected to a component of the filter unit. The cover element ensures that the outflow through the outflow channels positioned directly at the support core is impaired, in particular completely inhibited, so that the gaseous fluid from these flow channels that are immediately adjacent to the support core must permeate in radial direction father outwardly through the wall until it reaches flow channels that are axially open at the outflow side and are not covered by the cover element.

In this way, the central area is enlarged in which no axial outflow from the filter element takes place. At the same time, the outflow at radially father outwardly positioned flow channels is increased so that the risk of turbulence or swirls is reduced and a laminar axial flow is ensured with greater reliability. In this way, measuring results of a sensor that measures the flow rate downstream of the filter element may be improved and the measuring noise of this sensor may be reduced. The throughput through the filter element is not impaired or only insignificantly impaired by the cover element. As a whole, a substantially annular laminar outflow of the fluid passing through the filter element is achieved.

The cover element has advantages in particular in situations where the filter sheet of the filter element is glued immediately onto the outer wall of the support core. The adhesive between filter sheet and support core impairs the axial flow through the flow channels that are positioned immediately adjacent to the outer wall which however, as a result of the cover element that covers the flow channels at the outflow side is without any effect on the outflow of the fluid because the stream of fluid in these flow channels are forced as a result of the cover element to pass into radially father outwardly positioned flow channels.

It may be expedient to design the cover element in such a way that all of the flow channels positioned immediately adjacent to the support core are covered by the cover element axially at the outflow side. Moreover, it is advantageous that not only the immediately neighboring flow channels but also one or two further layers of flow channels adjoining in the radial direction are covered by the cover element. In this way, at the outflow side an annular space can be provided through which the outflow of the purified fluid takes place wherein the inwardly positioned radius of the annular space is provided only with reduced flow. In the annular space however an increased laminar flow is achieved that can be measured by a sensor with reduced measuring noise.

The cover element can be secured in various ways on the filter unit. On the one hand, gluing of the cover element onto the end face of the filter element is possible, either on the end face of the support core and/or on the end face of the filter sheet that forms the filter element. Possible is also securing of the cover element by means of securing ribs on a further component of the filter unit, in particular on a frame that frames the filter element, wherein the securing ribs are preferably formed monolithically with the cover element. The frame may also be a monolithic part of the securing ribs so that the cover element, the securing ribs, and the frame circumferentially surrounding the filter element form a common monolithic component that is preferably comprised of plastic material and in particular produced by plastic injection-molding.

The securing ribs extending between the cover element and the frame may be positioned relative to the central plane through the support core at an angle that is different from 90 degrees so that the securing ribs extend with a radial component along the end face of the filter element but have an additional component in circumferential direction. In principle, it is also possible that the securing ribs and the central plane through the support core are positioned at a 90 degree angle relative to one another.

Moreover it is expedient to provide the securing ribs with an aerodynamic contour in order to positively affect the axial outflow of the purified fluid. In this way, in particular an improved laminar outflow of the fluid can be achieved. Undesirable turbulence is reduced. The aerodynamic design of the securing ribs concern, on the one hand, their cross-section but, on the other hand, also the extension of the securing ribs between cover element and outwardly positioned frame that frames the filter element.

An additional improvement of the outflow can be achieved by means of an extension part that is to be placed onto the end face of the filter element and that is axially placed onto the cover element as well as the frame on the exterior side of the filter element and optionally also onto the securing ribs. The extension part is also aerodynamically designed and extends the components projecting axially past the outflow end face of the filter element in axial direction.

As an example, the filter element has an oval cross-section wherein in principle also round cross-sections are possible.

BRIEF DESCRIPTION OF THE DRAWINGS

Further advantages and expedient embodiments are disclosed in the additional claims, the figure description, and the drawings. It is shown in:

In the Figures same components are provided with same reference numerals.

EMBODIMENT(S) OF THE INVENTION

Figure 1:
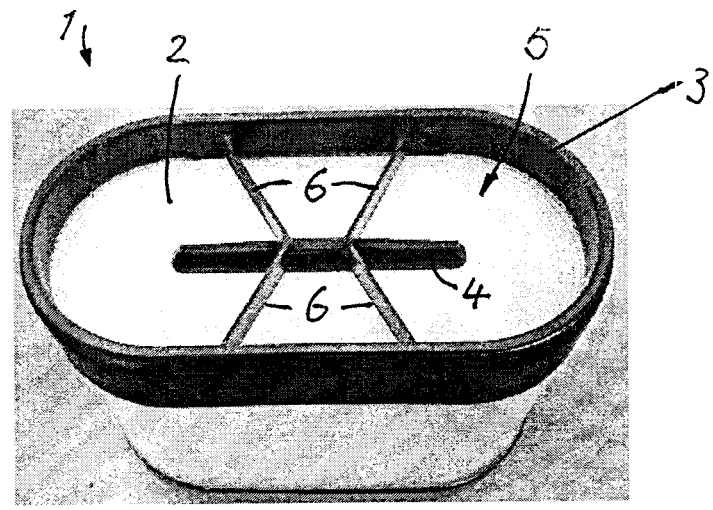
FIG. 1 a perspective view of a filter unit embodied as an air filter for internal combustion engines, comprising a spirally wound filter element that at the center is provided with a support core covered by a cover element wherein the cover element is connected by securing ribs with the frame surrounding the filter element.

The filter unit 1 illustrated in FIG. 1 is an air filter that is inserted in the intake manifold of an internal combustion engine for filtration of combustion air to be supplied to the cylinders. The filter unit 1 comprises a filter element 2 that in cross-section is of an oval shape and is embodied as a filter sheet that is spirally wound about a central support core. The flow through the filter element 2 is in axial direction; the illustrated end face of the filter element 2 represents the outflow side 5 through which the purified fluid exits the filter element.

The filter element 2 is framed by a frame 3 that extends on the exterior side of the filter element 2 in a ring shape and in radial direction as well as axial direction projects past the filter element 2 in the area of the outflow side 5. The frame 3 may be a support for a sealing element in order to separate the raw side or inflow side from the clean side or outflow side of the filter element in the mounted state of the filter unit.

At the outflow side 5 the filter element 2 has on the end face a cover element 4 that is connected by means of angularly positioned support of securing ribs 6 with the circumferentially extending frame 3. Expediently, the cover element 4, the securing ribs 6 as well as the frame 3 each are embodied as plastic components that are produced preferably by a plastic injection-molding process. In this connection, it may be expedient to design the cover element 4, the securing ribs 6, as well as the frame 3 as a monolithic plastic component.

The cover element 4 is positioned at the center of the end face of the filter element 2 and extends in longitudinal direction of the oval-shaped filter element. The cover element 4 rests on the support core about which the filter sheet of the filter element is wound spirally. The cover element 4 however not only axially covers the support core but additionally also at least one layer of flow channels positioned immediately adjacent to the support core that extend in axial direction and through which the fluid to be filtered flows. Because the ends of the flow channels extending immediately adjacent to the support core are covered at the end faces, outflow of the purified fluid through these channels is inhibited so that the fluid must pass through the radial walls of the flow channels in the outward direction until a flow channel that is open at the outflow side 5 is reached through which the fluid can exit axially. In this way, a more uniform outflow of the purified fluid is achieved.

The cover element 4 is embodied as an elongate cover member and from its sides the angularly positioned securing ribs 6 extend to the outwardly positioned frame 3. The securing ribs 6 are positioned relative to the longitudinal axis of the cover element 4, which at the same time is located within the longitudinal center plane of the support member, at an angle that is between 0 degrees and 90 degrees. In the embodiment the angle is approximately 60 degrees. On each side of the cover element 4 two securing ribs 6 are arranged that have an angle that opens outwardly.

Figure 2:
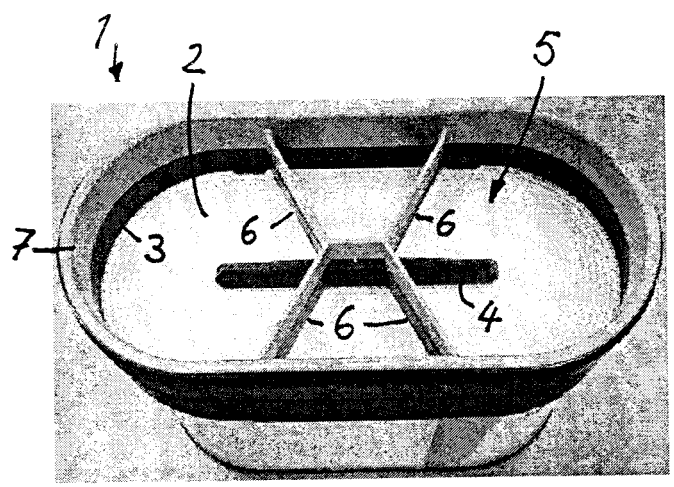
FIG. 2 shows a further air filter where an additional flow-optimized extension part is placed axially onto the outflow side.

In the embodiment according to FIG. 2, the filter unit 1 is identically embodied to that of FIG. 1 but at the outflow side 5 an additional axial extension part 7 is positioned. The axial extension part 7 has the function of optimizing fluidically the outflow through the outflow side 5. The extension part 7 is comprised of a circumferentially extending frame that is positioned onto the frame 3 that is connected immediately to the filter element 2. Moreover, the extension part 7 has ribs that are matched to the securing ribs 6 and are resting immediately thereon. As a result of this embodiment of the extension part 7, the free cross-sectional surface area at the outflow side 5 is not impaired by the extension part. At the same time, turbulence at the outflow side is reduced and the generation of a laminar flow is aided.

The securing ribs 6 as well as optionally the cover element 4 can be contoured aerodynamically in order to improve laminar flow.

Figure 3:
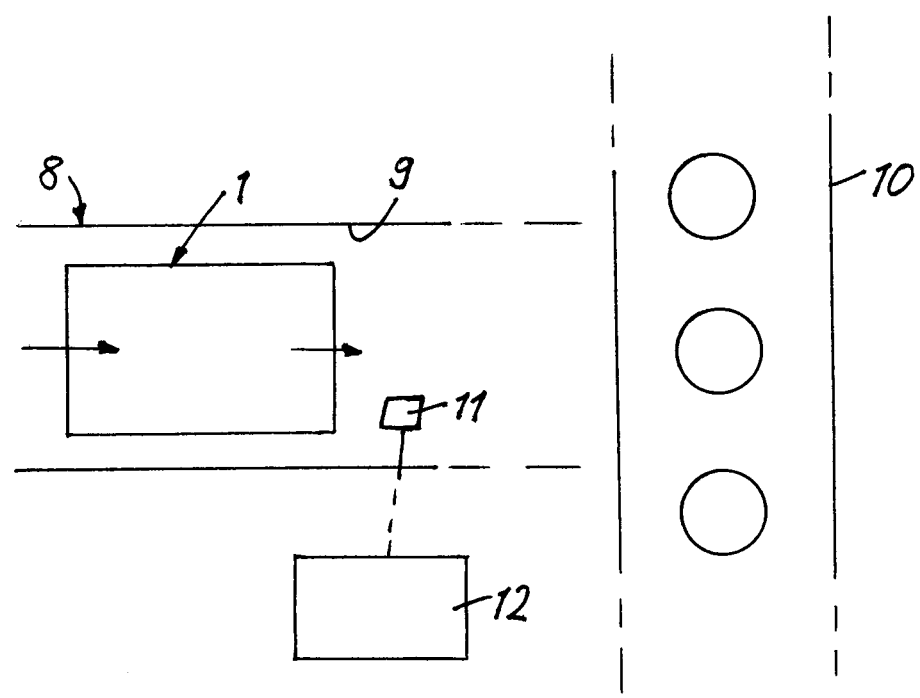
FIG. 3 shows in schematic illustration an intake module of an internal combustion engine with an air filter inserted into the intake passage and an mass airflow sensor that is arranged downstream of the air filter.

In FIG. 3 in a schematic way a section of an intake manifold of an internal combustion engine 10 is illustrated. In an intake module 8 there is an intake passage 9 into which the filter unit 1 is integrated for filtration of the combustion air supplied in the direction of the arrow. Downstream of the filter unit 1 in the intake passage 9 there is a sensor 11 for determining the flow rate of the combustion air, for example, a mass airflow sensor. The sensor signals of the sensor 11 are transmitted to an evaluation unit 12.

Figure 4:
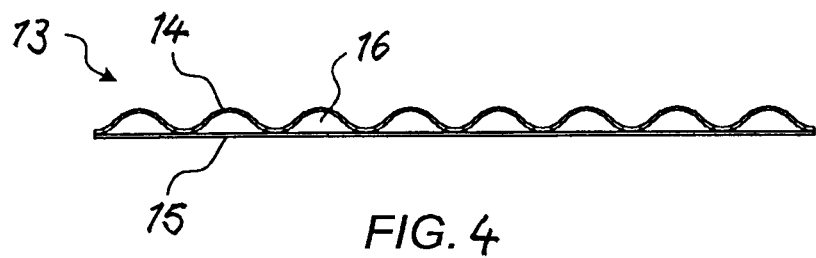
FIG. 4 a filter sheet comprised of a corrugated and a flat layer from which the filter element is made by winding.

In FIG. 4 a single filter sheet 13 from which the filter element is produced is illustrated in a flat, spread-out state. The filter sheet 13 is comprised of a corrugated filter layer 14 and a flat filter layer 15 wherein the two filter layers 14 and 15 are joined to one another, for example, by gluing. As a result of the corrugated shape of the filter layer 14 between the filter layers 14 and 15 flow channels 16 are formed through which the gaseous fluid to be filtered is guided.

Figure 5:
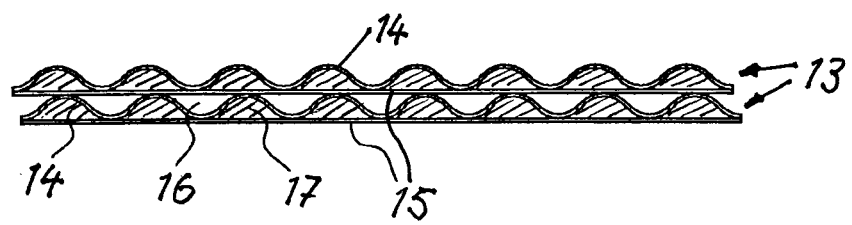
FIG. 5 two stacked filter sheets with intermediately positioned flow channels.

In FIG. 5 two filter sheets 13 are illustrated in stacked state. The filter sheets 13 are identically constructed and comprised each of a corrugated filter layer 14 and a flat filter layer 15 glued thereto. FIG. 5 illustrates a section through the wall area neighboring the end face where adhesive beads in the completed wound state of the filter element extend in circumferential direction so that the flow channels are closed off by adhesive 17 axially at the end face. The adhesive bead closes off the flow channels that are formed between corrugated filter layer and flat filter layer 15 of a filter sheet 13, respectively. As a result of the corrugated shape further flow channels 16 between the corrugated filter layer 14 of the first filter sheet and the flat filter layer 15 of the second filter sheet are formed; these flow channels 16 are not closed off by adhesive. In this way, in longitudinal direction of the filter sheet 13 flow channels alternatingly open and closed-off at the end faces are formed.

Figure 6:
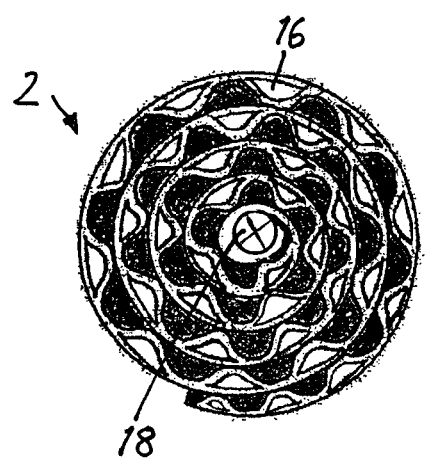
FIG. 6 a plan view onto the filter sheet that is wound spirally to a filter element having at its center a support core.

FIG. 6 shows a plan view onto the spirally wound filter element 2 with flow channels 16 that are alternatingly open and closed off. In the interior of the filter element 2 there is a support core 18 that provides additional stability to the filter element 2. The filter sheet of the filter element 2 is spirally wound about the support core 18 wherein the sections of the filter sheet that immediately rest against the support core 18 are expediently glued to the support core.

Figure 7:
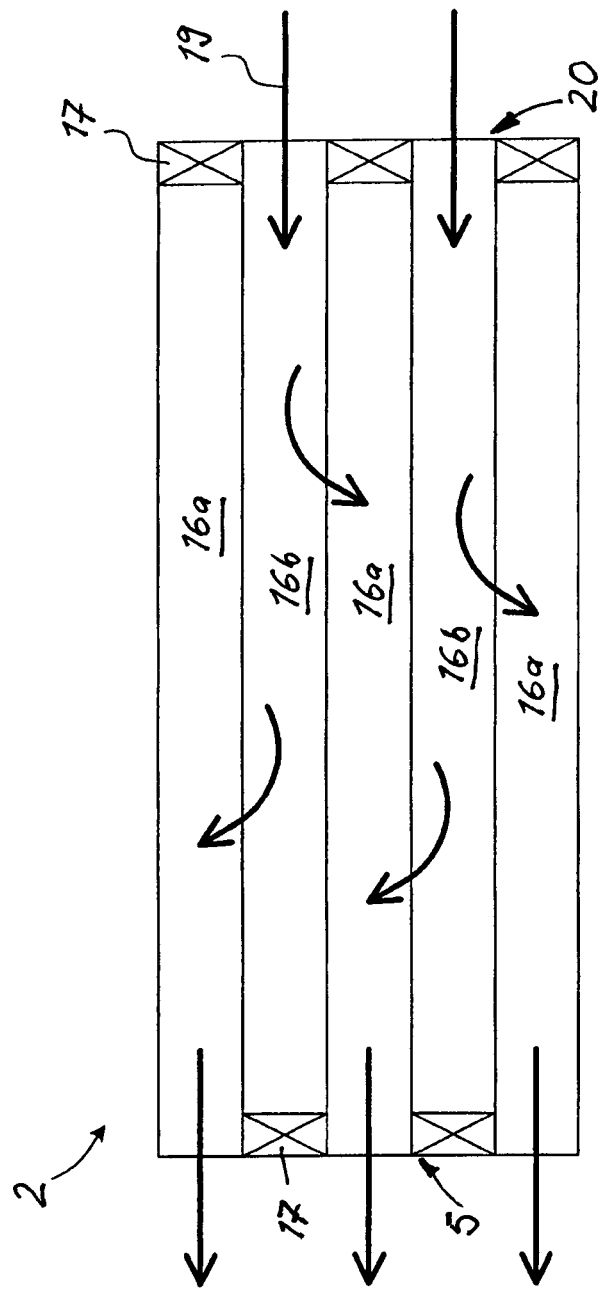
FIG. 7 the wound filter element in longitudinal section with a plurality of flow channels for the fluid to be cleaned wherein the flow channels at oppositely positioned axial end faces are alternatingly open or closed off.

In FIG. 7 the filter element 2 is illustrated that, as indicated by the arrows, is flowed through by the fluid in the flow direction 19. The fluid to be cleaned flows axially at the intake side 20 into the flow channels 16a, 16b and exits the filter element 2 at the oppositely positioned axial side through the outflow side 5.

The flow channels 16a and 16b that are positioned immediately adjacent to one another are alternatingly closed off or open. The flow channels 16a are embodied to be closed off at the inflow side 20 by adhesive 17 and open at the outflow side 5. The flow channels 16b on the other hand are embodied to be open at the inflow side 20 and closed off by adhesive 17 at the outflow side 5. By means of this embodiment that is alternatingly open or closed off at oppositely positioned axial end faces it is ensured that no flow channel is embodied to be continuous in axial direction so that the fluid entering the filter element at the inflow side 20 is forced to permeate the walls of each flow channel radially and to pass into the neighboring flow channel by means of which an axial outflow is possible.

Figure 8:
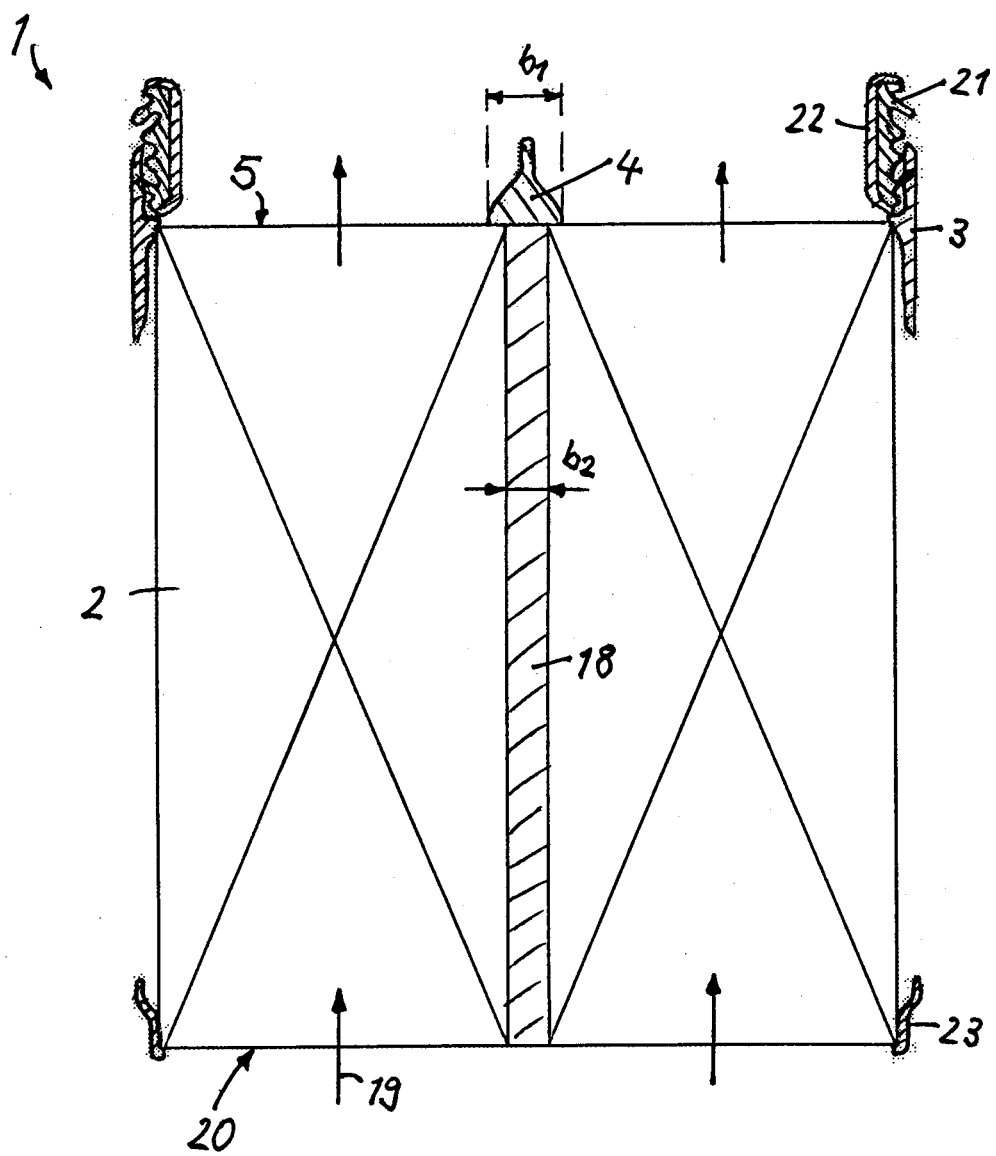
FIG. 8 a section of the filter element with a support core passing through the center and a cover element that is arranged at the outflow side and has a greater width than the support core.

As shown in FIG. 8, the cover element 4 viewed in transverse direction, i.e., transverse to the flow direction 19, is provided with a width b1 that is greater than the width b2 of the support core 18 that is covered by the cover element 4 at the outflow side 5. As a result of the greater width of the cover element 4 in relation to the support core 18 flow channels that are formed in the filter element 2 in immediate neighborhood to the external walls of the support core 18 are axially closed off in the area of the outflow side 5 even when these flow channels in principle are embodied to be open. In this way it is ensured that by means of the flow channels immediately positioned at the support core 18 no axial outflow takes place.

Moreover, FIG. 8 shows that on the frame 3 that is arranged in the area of the outflow side 5 at the filter element 2 a sealing element 21 is positioned that is secured on a component 22. The component 22 is expediently a component of a housing, for example, of the intake module. By means of sealing element 21, a flow-tight separation of raw side and clean side of the filter element 2 is ensured.

At the oppositely positioned axial area there is also a circumferentially extending frame 23 on the filter element 2 at the inflow side 20 that is used, for example, for supporting the filter element 2 in the mounted position.

Figure 9:
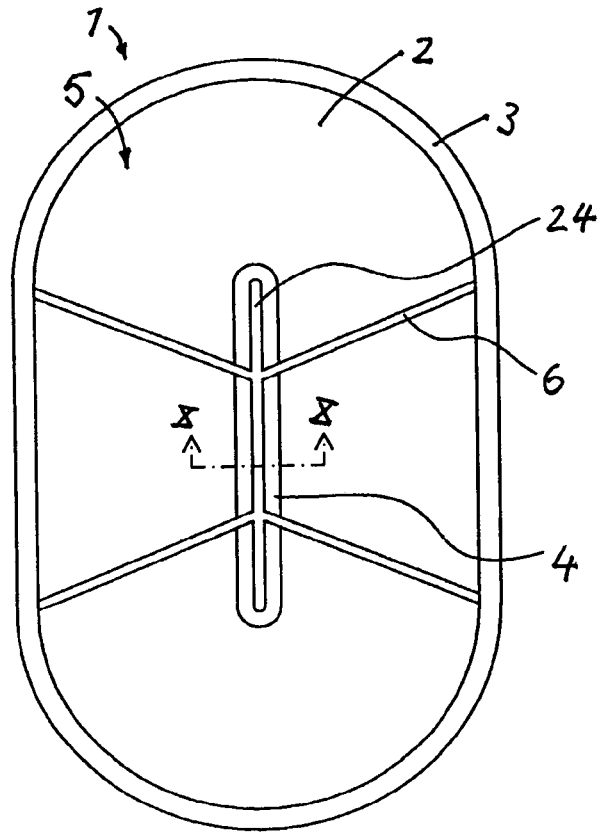
FIG. 9 a plan view of an oval filter element with a cover element which is secured by securing ribs on the circumferentially extending frame of the filter element.

As shown in FIG. 9, the cover element 4 is embodied as an elongate body that extends in the direction of the longitudinal side of the oval-shaped cross-section of the filter element 2 at the outflow side 5. The support core is also embodied as an elongate body wherein the cover element 4 completely covers the end face of the support body at the outflow side 5, i.e., in both transverse directions, i.e. in the direction of the longer and in the direction of the shorter length of the oval shape. The cover element 4 that is connected by means of the securing ribs 6 with the circumferentially extending frame 3 and is supported by it is provided with an axially projecting reinforcement rib 24 that extends also in the longitudinal direction of the cover element.

Figure 10:
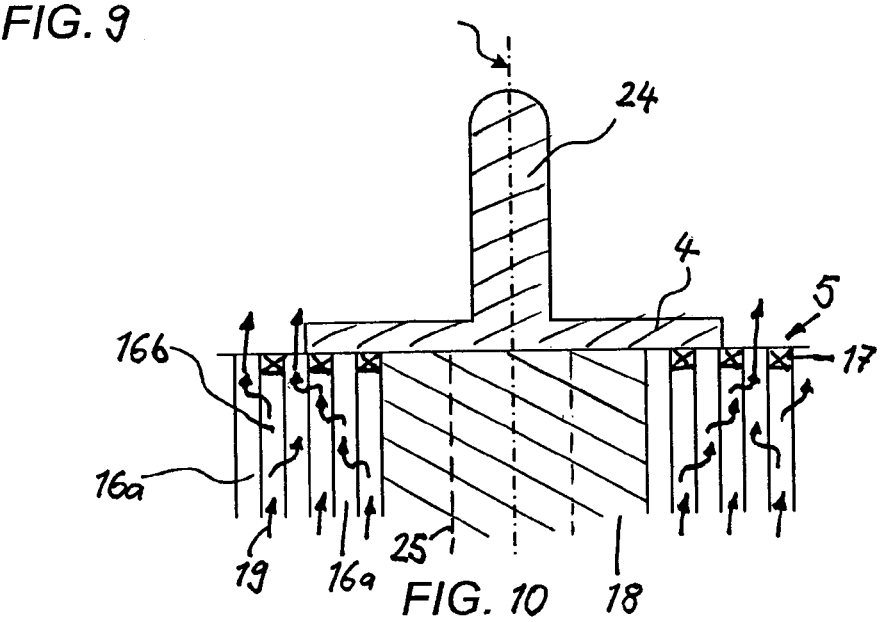
FIG. 10 a section according to section line X-X of FIG. 9.

In FIG. 10 a section illustration according to section line X-X of FIG. 9 is illustrated. The cover element 4 covers not only the axial end face of the support core 18 in the area of the outflow side 5 but also moreover three layers of flow channels 16*a*, 16*b* extending adjacent to the exterior side of the support core 18. In this way, the flow channels 16*a* that are actually open at the axial outflow side are closed off flow-tightly by the cover element 4 so that fluid that is within these flow channels 16*a* must pass radially outwardly through the walls of the flow channels until a flow channel 16*a* is reached that is open at the axial end face and is no longer covered by the cover element 4.

The support core 18, as illustrated in dashed lines 25, may also be embodied as a hollow body.

Figure 11:
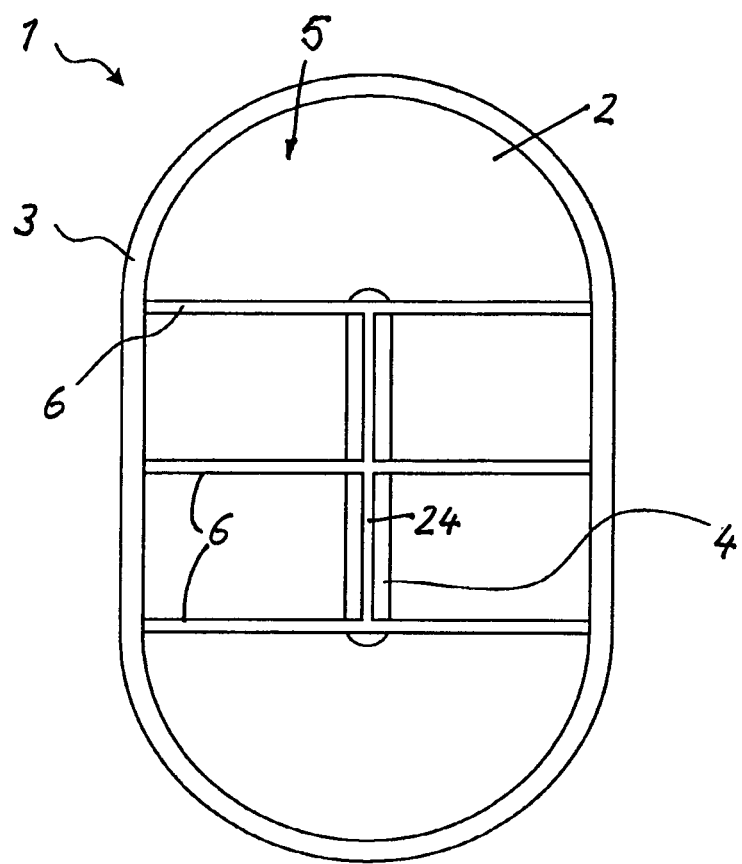
FIG. 11 a plan view onto a further filter unit in which the support ribs are positioned at an angle of 90 degrees relative to a center plane through the cover element.

The embodiment according to FIG. 11 differs from that according to FIG. 9 in that the securing ribs 6 that connect the cover element 4 with the circumferentially extending frame 3 extend at an angle of 90 degrees relative to the longitudinal center plane through the cover element 4. In the embodiment according to FIG. 9 the securing ribs 6 are however positioned angularly in an angle range of approximately 60 degrees.

Figure 12:
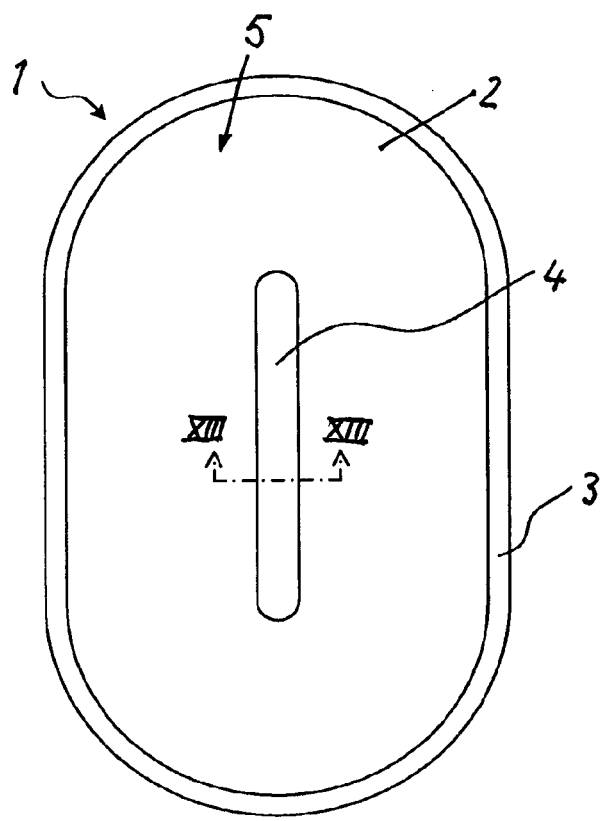
FIG. 12 a plan view onto a further filter unit in which the cover element is connected immediately with the support frame and/or the end face edges of the filter element.
Figure 13:
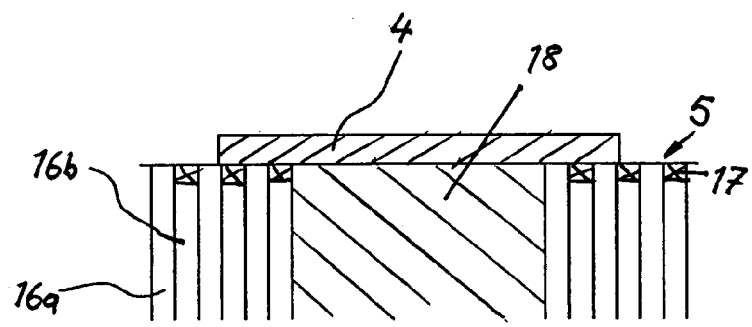
FIG. 13 a section illustration according to section line XIII-XIII of FIG. 12.

In the embodiment according to FIGS. 12 and 13 the cover element 4 is not connected by means of securing ribs with the circumferentially extending frame 3 but glued to the support core 18. Optionally, an adhesive connection with the axial end face of the filter element 2 in the area of the outflow side 5 is possible also. Securing ribs are not provided for in FIGS. 12 and 13.

The cover element 4 is plate-shaped; no axially projecting reinforcement rib at the cover element 4 is provided.

Figure 14:
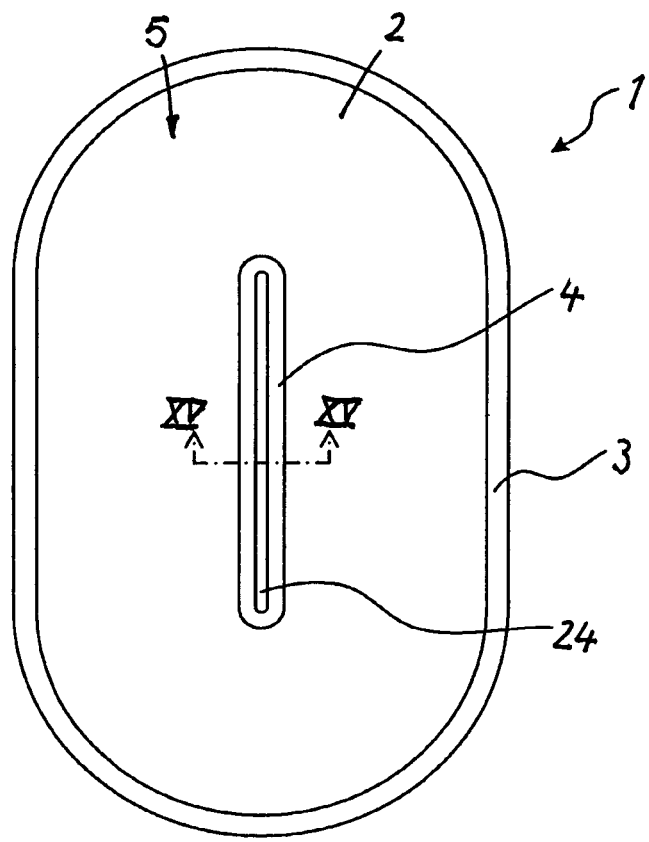
FIG. 14 a plan view of a further filter unit in which the cover element is provided with an axially projecting reinforcement rib.
Figure 15:
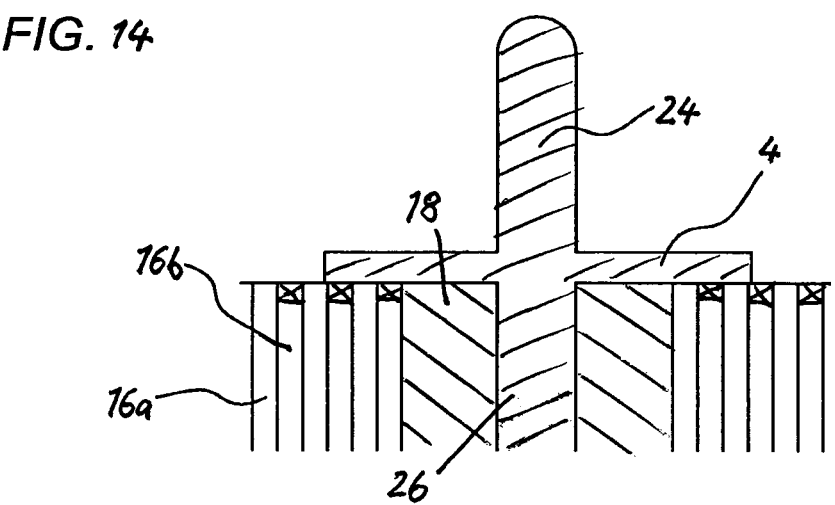
FIG. 15 a section illustration according to section line XV-XV of FIG. 14.

In the embodiment according to FIGS. 14 and 15 securing ribs between the cover element 4 and the circumferentially extending frame 3 are also not provided. The cover element 4 is provided with an axially outwardly projecting reinforcement rib 24. Moreover, the cover element 4 is provided on the side facing the filter element with a monolithic projection 26 that projects into a central recess that is provided in the support core 18. The projection 26 may be glued to the support core 18; also, an adhesive connection is possible between the side of the cover element 4 that is facing the filter element and the end face of the support core 18 as well as optionally the ends of the flow channels at the end faces.

Figure 16:
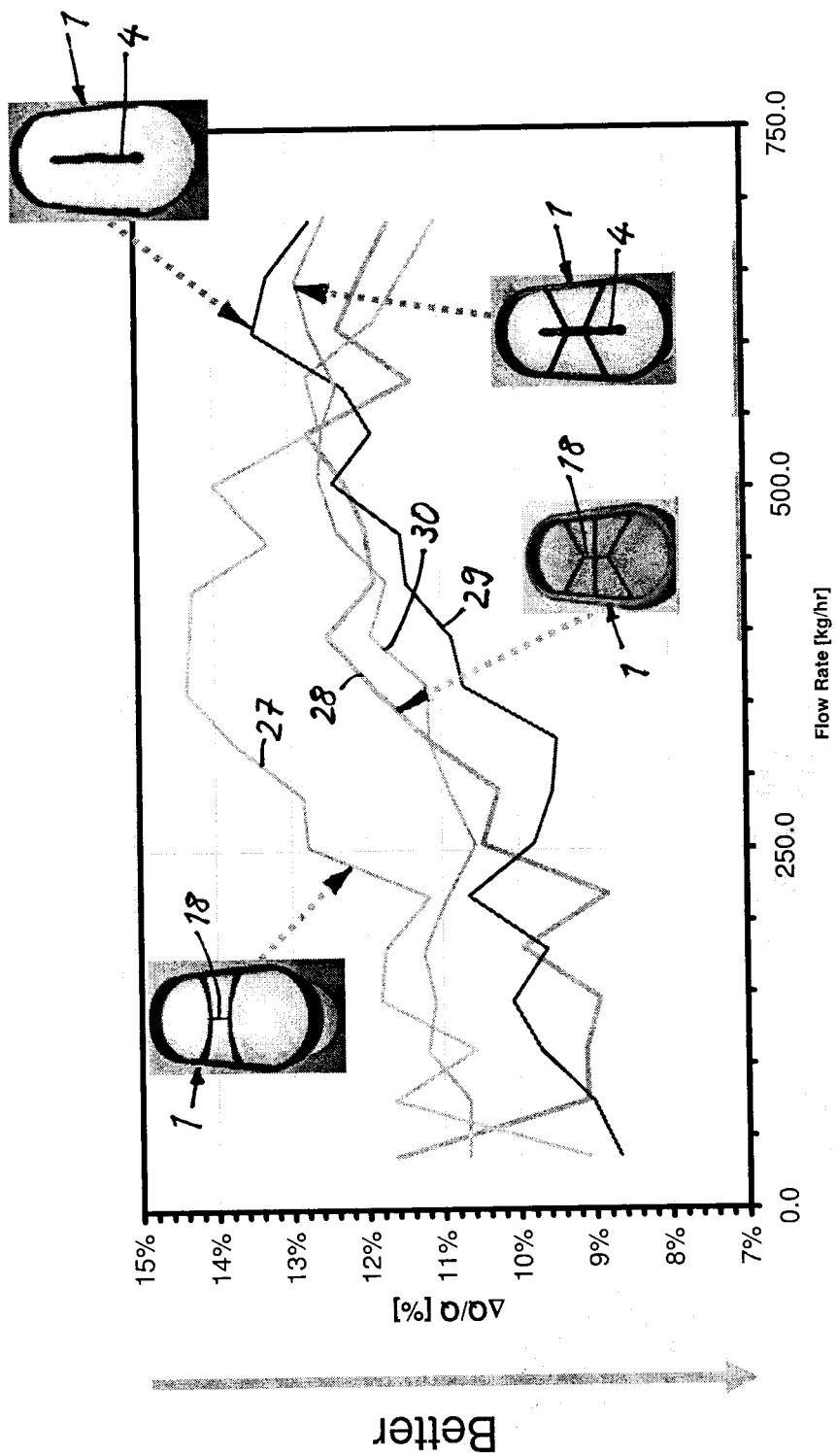
FIG. 16 a graph showing the course of noise curves as a function of mass airflow through the filter element for various embodiment variants of the filter unit.

In the graph according to FIG. 16 the noise curves for different embodiment variants of the filter units 1 are illustrated. The noise curves 27 to 30 indicate the noise behavior of the fluid exiting from the filter element as a function of the mass flow that is passing through the filter element. The noise behavior is characterized by the fluctuation width ΔQ relative to the mass flow Q. The smaller the noise behavior, the higher the quality of the signal that is measured by the mass airflow sensor arranged downstream of the filter element.

The noise curves 27 and 28 concern filter units 1 that only have a support core 18 in the filter element but no cover element that covers the end face of the support core 18 and the flow channels that are immediately adjoining the support core at the outflow side. The noise curves 29 and 30 concern however filter units 1 that are provided with such a cover element 4.

In particular at low or medium mass flows it is apparent from the noise curves 27 and 28 that the absence of a cover element causes a higher noise curve 27 or 28 and thus greater noise or a bad signal quality. The two embodiment variants with the cover element 4, illustrated by the noise curves 29 and 30, on the other hand show up to higher mass flow ranges a lower course and thus an improved noise behavior.

The invention claimed is:

1. An air filter unit for internal combustion engines, comprising:
    a spirally wound filter element having opposing axial end faces, said filter element including
        a support core;
        a filter sheet spirally wound about said support core and having a plurality of parallel extending flow channels for filtration of air;
        wherein neighboring flow channels of said parallel channels are alternatingly open or closed off at oppositely positioned end faces;
    wherein said parallel flow channels that are immediately adjacent to the support core and are open at an axial outflow side are covered by an additional cover element that is connected to a component of the filter unit;
    wherein said cover element completely covers said support core at its axial end face.

2. The filter unit according to claim 1, wherein
    several flow channels immediately adjoining the support core in the radial direction are covered by the cover element.

3. The filter unit according to claim 1, wherein
    all flow channels immediately adjacent to the support core are covered by the cover element at the axial outflow side of the filter element.

4. The filter unit according to claim 1, further comprising:
    a circumferentially extending frame that frames said filter element;
    wherein said cover element is connected by securing ribs to said circumferentially extending frame.

5. The filter unit according to claim 4, wherein
    said securing ribs are positioned angularly relative to a center plane through said support core.

6. The filter unit according to claim 5, wherein
    said securing ribs are positioned at an angle different from 90 degrees relative to said center plane through said support core.

7. The filter unit according to claim 5, wherein
    said securing ribs are positioned at a right angle relative to said center plane through said support core.

8. The filter unit according to claim 5, wherein
    said securing ribs are aerodynamically contoured.

9. The filter unit according to claim 5, wherein
    said cover element, said securing ribs and said frame are formed as a monolithic component as a plastic injection-molded component.

10. The filter unit according to claim 5, wherein
    flow channels immediately adjoining the support core in the radial direction are covered by the cover element;
    said cover element covers fluid-tightly said immediately adjoining flow channels that are open at the axial outflow side;
    said cover element, said securing ribs and said frame are formed as a monolithic component as a plastic injection-molded component;
    wherein said cover element is formed monolithically with said support core;
    wherein said cover element is provided with an axially projecting reinforcement rib;
    and
    wherein in an area of the outflow side a flow-optimized extension part is placed onto the end face of the filter element.

11. The filter unit according to claim 1, wherein
said cover element is glued onto said end face of said filter element.

12. The filter unit according to claim 11, wherein
flow channels immediately adjoining the support core in the radial direction are covered by the cover element;
said cover element covers fluid-tightly said immediately adjoining flow channels that are open at the axial outflow side;
wherein said cover element is formed monolithically with said support core;
wherein said filter sheet is glued to said support core;
wherein said cover element is provided with an axially projecting reinforcement rib;
wherein said filter element has an oval cross-section; and
wherein in an area of the outflow side a flow-optimized extension part is placed onto the end face of the filter element.

13. The filter unit according to claim 1, wherein
said cover element is formed monolithically with said support core.

14. The filter unit according to claim 1, wherein
said filter sheet is glued to said support core.

15. The filter unit according to claim 1, wherein
said cover element is provided with an axially projecting reinforcement rib.

16. The filter unit according to claim 1, wherein
said filter element has an oval cross-section.

17. The filter unit according to claim 1, wherein
in an area of the outflow side a flow-optimized extension part is placed onto the end face of the filter element.

18. An intake module of an internal combustion engine with a filter unit according to claim 1 and a mass airflow sensor arranged downstream of the filter unit.

19. An air filter unit for internal combustion engines, comprising:
a spirally wound filter element having opposing axial end faces, said filter element including
a support core;
a filter sheet spirally wound about said support core and having a plurality of parallel extending flow channels for filtration of air;
wherein neighboring flow channels of said parallel channels are alternatingly open or closed off at oppositely positioned end faces;
wherein said parallel flow channels that are immediately adjacent to the support core and are open at an axial outflow side are covered by an additional cover element that is connected to a component of the filter unit;
wherein the cover element covers fluid-tightly said immediately adjacent flow channels that are open at the axial outflow side.

* * * * *